Patented Feb. 20, 1940

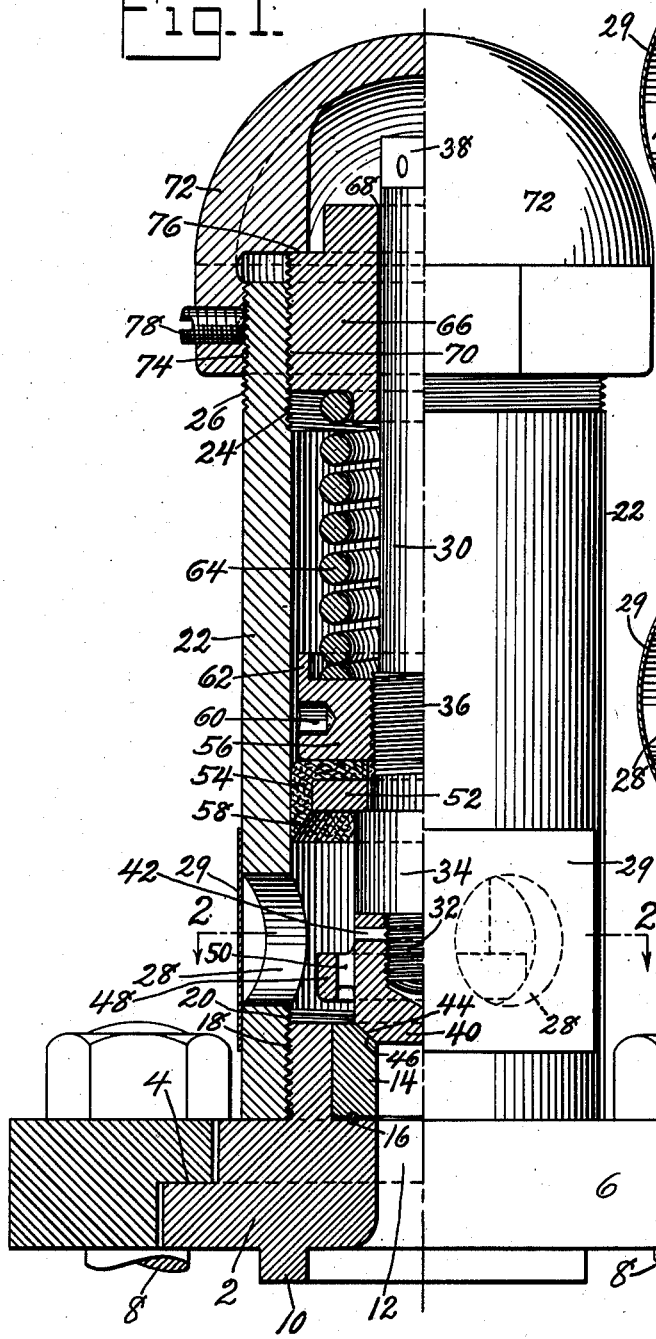

2,190,725

UNITED STATES PATENT OFFICE 2,190,725

SAFETY VALVE

John J. McBride, Bayonne, N. J., assignor to American Car and Foundry Company, New York, N. Y., a corporation of New Jersey Application December 8, 1938, Serial No. 244,660

4 Claims. (Cl. 137—53)

This invention relates to safety valves in general and in particular to safety valves intended for use with containers carrying corrosive material under pressure.

In the past various safety valves have been used in connection with corrosive materials such as chlorine, but these valves have invariably permitted a small amount of gas or liquid to come in contact with the spring, thus weakening the same and destroying the value of the valve. It is an object, therefore, of the present invention to provide a safety valve in which the spring will be positively protected against corrosive material or gases.

A further object of the invention is the provision of a safety valve in which the spring or other actuating member is protected from corrosive material by means of an expansible gasket which is immediately subjected to pressure upon movement of the valve from its seat.

A still further object of the invention is the provision of a safety valve, the working parts of which are sealed against contact with corrosive material and which valve may be manufactured with a minimum of expense and time.

These and other objects of the invention will be apparent to persons skilled in the art from a study of the following description and accompanying drawing, in which:

Figure 1 is an elevational view of the improved valve with one-half thereof being shown in section to better disclose the interior arrangement;

Fig. 2 is a sectional view taken substantially on line 2—2 of Figure 1 looking in the direction of the arrows, and Fig. 3 is a sectional view taken substantially on line 2—2 of Figure 1 but looking in the opposite direction.

Referring now to the drawing in detail, it will be seen that the safety valve consists of a base 2 shouldered as at 4 to receive a clamping ring or segment 6 by means of which the safety valve may be clamped upon the tank or other receptacle (not shown) by means of bolts 8 or other devices. The base as is customary is provided on its lower surface with an annular projection 10 which will engage within a groove on the receptacle to seal the safety valve and prevent escape of gas between the base and receptacle. The central portion of the base is removed to provide bore 12 enlarged at its upper portion to receive a valve seat member 14 shrunk in position and sealed with respect to the base by means of a lead or other gasket 16. The upper projecting portion of the base is externally threaded as at 18 for engagement with the internal threads 20 of the valve body 22.

The valve body is preferably formed by a short length of extra heavy pipe internally threaded at the lower end as previously referred to and at the upper end as at 24, which end is also externally threaded as at 26. A plurality of transverse holes 28 are drilled in the lower portion of the pipe immediately above the lower internally threaded portion, which holes will provide escape ports for discharge of gases. These ports will be sealed when the valve is in service by means of plates 29 attached to the exterior of the valve body, which plates may readily rupture to permit escape of gases and give an indication as to whether the valve is leaking or not. These plates may be of thin metal clamped, soldered or brazed in position or they may consist merely of paper or similar material glued or pasted in position. Interiorly of the valve body is arranged the valve stem 30 preferably formed from round stock and machined to provide at its lower end threads 32 below an enlarged or shouldered portion 34. Immediately above this shouldered portion the stem is threaded as at 36 with the remainder of the stem being plain round with the exception of the upper extremity 38 which is made square or some other form in order to receive a wrench by means of which parts attached to the valve may be readily assembled. The valve 40 is preferably made of some non-corrosive metal bored and internally threaded to engage the threads 32 of the stem by means of which it may be clamped against the shouldered portion 34 and locked in place by means of a pin or other device 42 extending through the valve and lower portion of the stem. The valve is provided with the customary bearing surface 44 adapted to engage the correspondingly formed bearing portion 46 of the seat member and the valve is also provided with an annular shoulder 48 projecting outwardly from the valve above the bearing surface. This shoulder is provided with any suitable number of vertically extending openings 50 adapted to direct a certain portion of the escaping gases upwardly substantially parallel to the valve stem for a purpose later to be described. Immediately above the shoulder 34 a ring 52 is placed providing a bearing for a cup washer or gasket member 54 clamped in place by means of a clamping washer 56, which washer is internally threaded for engagement with the threads 36 on the valve stem. The cup-shaped washer has its lower rim tapered as at 58 in order that it may be extremely flexible and readily expanded to contact closely with the interior surface of the heavy pipe forming the valve body. The clamping washer is formed with openings 60 in its side portion by means of which it may be tightly clamped against the washer and is also formed on its upper surface with a projecting rim 62 forming a seat cup for the lower end of a spring 64, the upper end of which bears against an adjusting nut 66. This adjusting nut is provided with a smooth internal bore 68 surrounding the smooth portion of the valve stem and is externally threaded as at 70 to engage the internal threads 24 of the valve body. By turning this adjusting nut it is obvious that the compression on the spring may be readily adjusted and once adjusted it may be held in this adjustment by means of a combination locking and sealing cap 72. This locking and sealing cap is preferably dome shaped with the lower external portion formed hexagonal to receive a wrench by means of which the cap may be turned down upon the valve body. The cap is internally threaded as at 74 to engage the external threads 26 of the valve body and immediately above these internal threads it is formed with a shoulder 76 adapted to bear against the upper surface of the adjusting nut. It will thus be seen that screwing the cap down into position on the body the shoulder will bear upon the adjusting nut and hold the same rigidly in position. The cap may then be locked in its position by means of a set screw 78 bearing against the valve body. It will be obvious from the description that the valve may be quickly and cheaply manufactured with a minimum amount of machine work and without the necessity of expensive patterns, dies or other devices for forming parts of the valve since nearly all parts may be formed from standard material available in the shop. It will also be obvious that a valve has been provided in which the parts are fully sealed against entrance of any foreign matter and which will give an indication as to leakage of the valve or as to the popping thereof.

While the operation of the safety valve is believed obvious, it may be well to point out that when the pressure in the receptacle has risen to such a point as to cause the valve to lift from its seat, the escaping gases will have at least a portion trapped and directed upwardly by the holes 50, thus causing a plurality of jets to strike against the flexible edge 58 of the cup-shaped washer and immediately expand the same. This action is also supplemented by a portion of the gases striking the wall of the body intermediate the escape ports and flowing upwardly against the gasket. In other words, as soon as the valve lifts from its seat the cup-shaped washer will be immediately expanded into close contact with the side walls of the valve body preventing any passage of gas into the space in which the spring is located. The possibility of gas getting into the spring area is also lessened by means of the improved form of protecting and clamping cap which of itself seals the spring space preventing any passage of air to or from the space and thus discouraging the entrance of gas or other material into the space.

While the device has been described more or less in detail it will be obvious that various modifications and rearrangements of parts will suggest themselves to persons skilled in the art and all such modifications and rearrangements of parts are contemplated as fall within the scope of the following claims.

What is claimed is:

1. In a safety valve, the combination of a base having an opening therein for the escape of gases under pressure, a valve member normally closing said opening, a valve body secured to the base and housing said valve member, a valve stem secured to said valve member and extending upwardly in said body, spring means surrounding said stem for yieldingly holding said valve member seated upon said base to close said opening, a cup-shaped gasket secured to said stem between said valve member and spring, said gasket being formed with a relatively flexible downwardly directed edge portion engageable with said valve body to prevent escaping gases contacting said spring, and openings in said valve member for directing escaping gases into contact with said edge portion of said gasket thereby causing immediate expansion thereof upon the escape of gases past said valve member.

2. In a safety valve, the combination of a base having an opening therein for the escape of gases under pressure, a valve member normally closing said opening, a valve body secured to the base and housing said valve member, a valve stem secured to said valve member and extending upwardly in said body, spring means surrounding said stem for yieldingly holding said valve member seated upon said base to close said opening, a cup-shaped gasket secured to said stem between said valve member and spring, said gasket being formed with a flexible downwardly tapered edge portion engageable with said valve body to prevent escaping gases contacting said spring, and openings in said valve member for directing escaping gases against said tapered edge portion to cause rapid movement thereof into sealing contact with said valve body.

3. In a safety valve, the combination of a base having an opening therein for the escape of gases under pressure, a valve member normally closing said opening, a valve body secured to the base and housing said valve member, a valve stem secured to said valve member and extending upwardly in said body, spring means surrounding said stem for yieldingly holding said valve member seated upon said base to close said opening, a cup-shaped gasket secured to said stem between said valve member and spring, said gasket being formed with a relatively flexible downwardly directed edge portion engageable with said valve body to prevent escaping gases contacting said spring, discharge ports formed in said valve body between said gasket and valve member, and frangible means closing said ports, said frangible means causing said gasket to be subjected to a momentarily increased pressure thereby causing rapid movement thereof into sealing contact with said valve body.

4. In a safety valve, the combination of a base having an opening therein for the escape of gases under pressure, a valve member normally closing said opening, a valve body secured to the base and housing said valve member, a valve stem secured to said valve member and extending upwardly in said body, spring means surrounding said stem for yieldingly holding said valve member seated upon said base to close said opening, a cup-shaped gasket secured to said stem between said valve member and spring, said gasket being formed with a relatively flexible downwardly directed edge portion engageable with said valve body to prevent escaping gases contacting said spring, discharge ports formed in said valve body between said gasket and valve member, frangible means normally closing said ports, and openings in said valve member for directing at least a portion of the escaping gases past said frangible means and into contact with said edge portion of said last named gasket, said openings and frangible means cooperating to subject said gasket to a momentarily increased pressure thereby causing rapid movement of said edge portion into sealing contact with said valve body.

JOHN J. McBRIDE.